(12) United States Patent
Seman, Jr. et al.

(10) Patent No.: US 8,358,108 B2
(45) Date of Patent: Jan. 22, 2013

(54) SYSTEM AND METHOD FOR RE-INITIATING CHARGE CYCLE FOR BATTERY PACK LEFT IN A CHARGER

(75) Inventors: Andrew E. Seman, Jr., White Marsh, MD (US); Daniel J. White, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 766 days.

(21) Appl. No.: 12/195,618

(22) Filed: Aug. 21, 2008

(65) Prior Publication Data

US 2009/0058368 A1 Mar. 5, 2009

Related U.S. Application Data

(60) Provisional application No. 60/967,578, filed on Sep. 5, 2007.

(51) Int. Cl.
*H02J 7/00* (2006.01)

(52) U.S. Cl. ......... 320/134; 320/112; 320/128; 320/135

(58) Field of Classification Search .................. 320/128, 320/134
See application file for complete search history.

(56) References Cited

U.S. PATENT DOCUMENTS

| | | | | | |
|---|---|---|---|---|---|
| 5,818,201 | A | * | 10/1998 | Stockstad et al. | 320/119 |
| 6,051,957 | A | * | 4/2000 | Klein | 320/132 |
| 6,144,186 | A | * | 11/2000 | Thandiwe et al. | 320/134 |
| 2002/0162037 | A1 | * | 10/2002 | Woods et al. | 713/322 |
| 2005/0134228 | A1 | * | 6/2005 | Elder | 320/134 |
| 2007/0182380 | A1 | * | 8/2007 | DiGiovanna et al. | 320/150 |

* cited by examiner

*Primary Examiner* — Edward Tso
*Assistant Examiner* — Johali Torres Ruiz
(74) *Attorney, Agent, or Firm* — Michael Aronoff

(57) ABSTRACT

A system and method is provided for initiating a charge cycle for a battery pack left in a battery charger. The battery pack includes a battery control unit which is operable to place the battery pack in a sleep mode after a predefined period of inactivity. The battery charger in turn is operable to deliver a charging signal to the battery pack in response to the battery pack entering a sleep mode.

8 Claims, 3 Drawing Sheets

SYSTEM AND METHOD FOR RE-INITIATING CHARGE CYCLE FOR BATTERY PACK LEFT IN A CHARGER

CROSS-REFERENCE TO RELATED APPLICATIONS

This application claims the benefit of U.S. Provisional Application No. 60/967,578, filed on Sep. 5, 2007. The disclosure of the above application is incorporated herein by reference.

FIELD

The present disclosure relates generally to a battery pack and, more particularly, to a system and method for re-initiating a charge cycle for a battery pack left in a battery charger.

BACKGROUND

Over the past few years, lithium-ion (Li-ion) batteries have begun replacing nickel-cadmium (NiCd), nickel-metal-hydride (NiMH), and lead-acid batteries in low-voltage, portable electronic devices such as notebook-type personal computers. As compared to NiCd and NiMH batteries, Li-ion batteries are lighter and have a larger capacity per unit volume. For this reason, Li-ion batteries are suitable to low-voltage devices that are preferably light and which are required to endure continuous use for a long time.

Unlike a NiCd battery pack and a NiMH battery pack, Li-ion batteries deteriorate rapidly in an over-discharged state. Thus, Li-ion battery packs may include functionality to protect against over-discharging. For example, it is desirable to provide a system and method for recharging the pack in the event a battery pack is left in a battery charger for a prolonged period of time.

The statements in this section merely provide background information related to the present disclosure and may not constitute prior art.

SUMMARY

A system and method is provided for initiating a charge cycle for a battery pack left in a battery charger. The battery pack includes a battery control unit which is operable to place the battery pack in a sleep mode after a predefined period of inactivity. The battery charger in turn is operable to deliver a charging signal to the battery pack in response to the battery pack entering a sleep mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
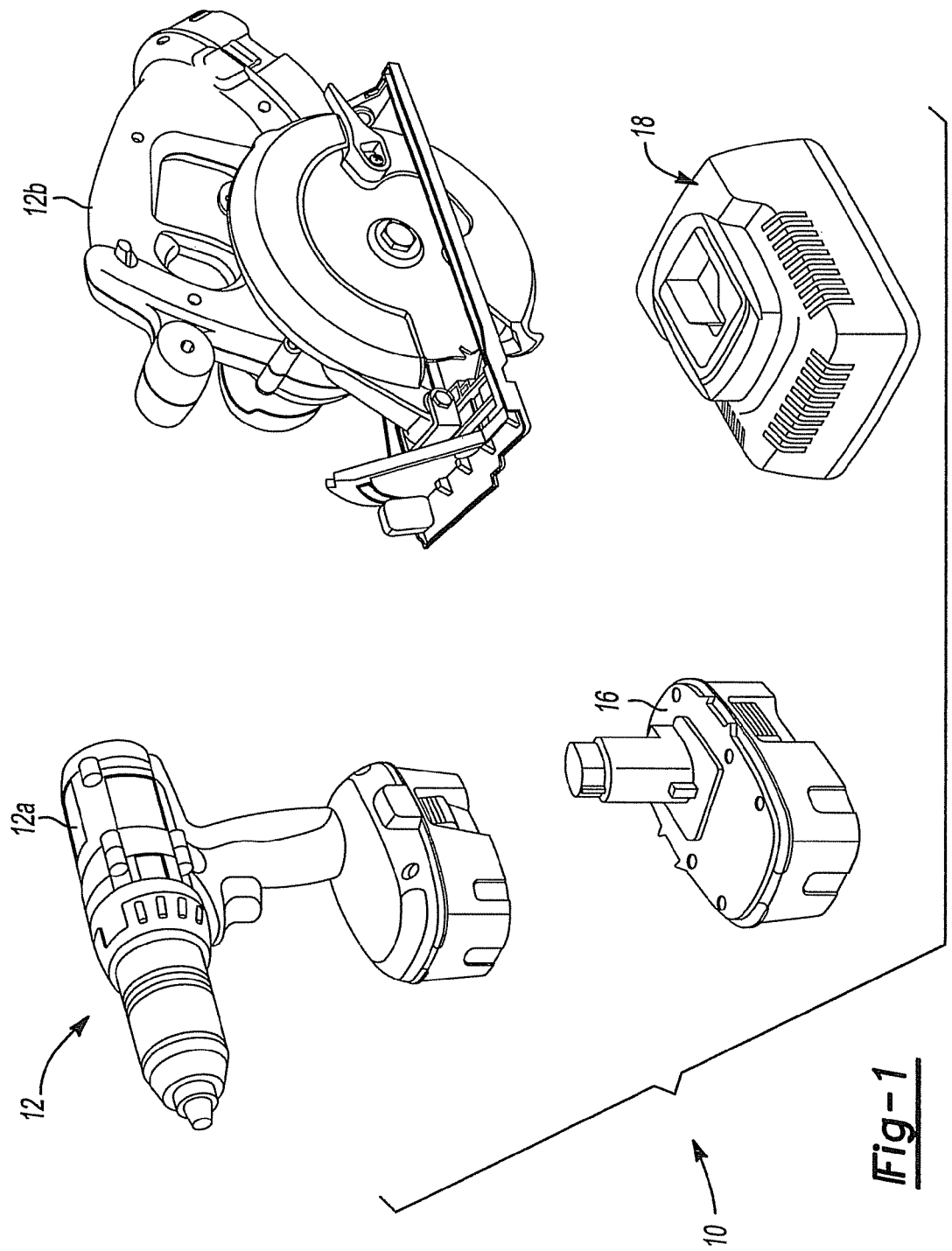
FIG. 1 is a diagram of an exemplary system of power tools.

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. It is noteworthy that the broader aspects of this disclosure are applicable to other types of battery powered devices.

Figure 2:
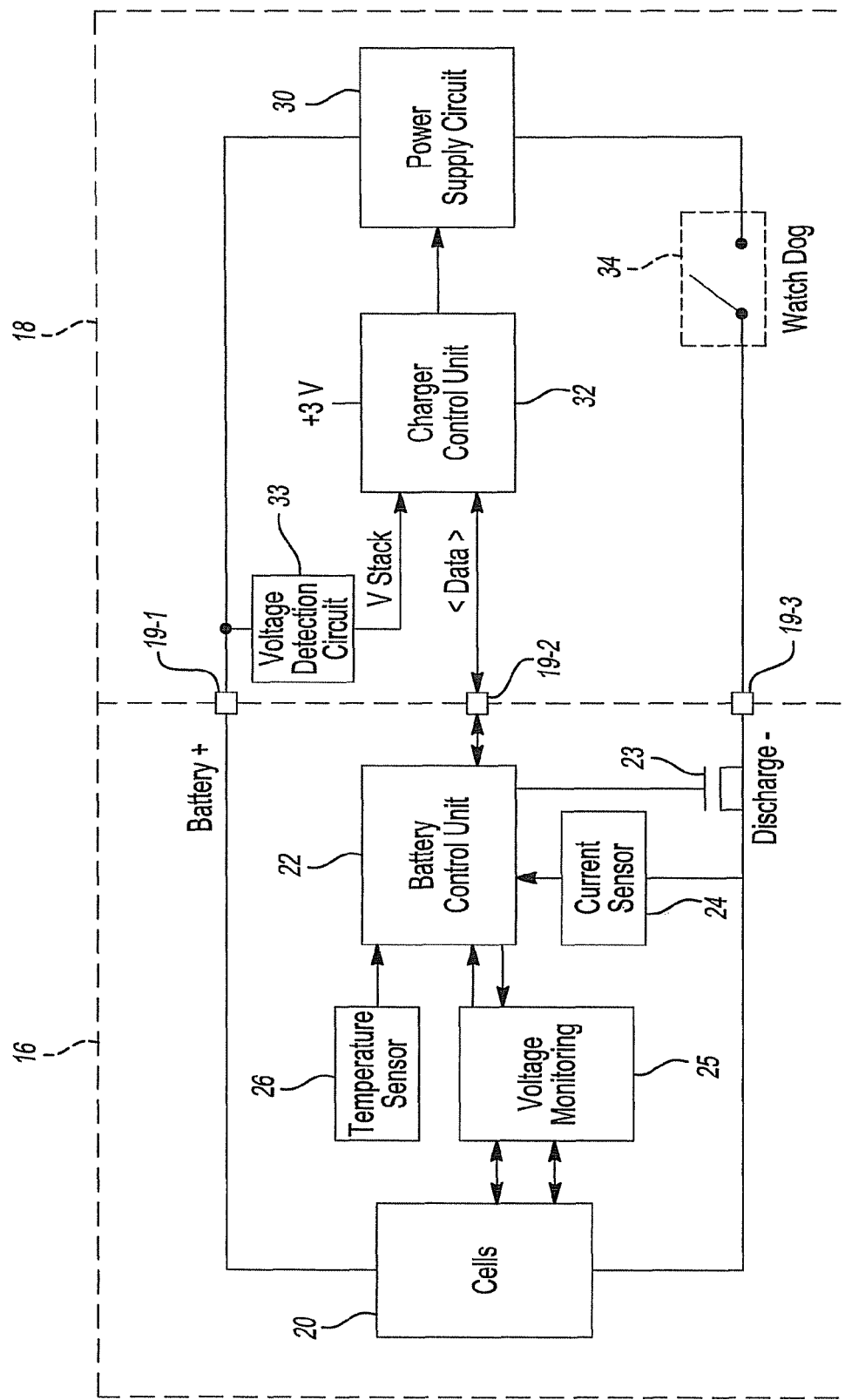
FIG. 2 is a block diagram of an exemplary configuration for a battery pack operably coupled to battery charger.

FIG. 2 illustrates an exemplary configuration of a battery pack 16 operably coupled to a battery charger 18. The battery pack 16 is generally comprised on a plurality of battery cells 20, a battery control unit 22 and various battery control circuits. Except as otherwise described herein, the battery pack 16 can be configured in a manner that is similar to that which is described in U.S. Patent Application Publication No. 2006/0096771 which is hereby incorporated by reference. However, the exemplary configuration is merely provided as a context for describing the various protection methods and circuits disclosed herein. Other configurations are contemplated within the broader aspects of this disclosure.

The battery pack 16 may include a plurality of battery cells 20 connected in series, and/or a plurality of serially-connected strings of cells, in which the strings are in parallel with one another. For purposes of describing the exemplary embodiments, the battery pack may be composed of cells having lithium-ion cell chemistry. In the context of cordless power tools, the nominal voltage rating of the battery pack is typically at least 18 volts. However, other voltage ratings are contemplated for different applications. In addition, the battery pack may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack. While the charging routines described below are particularly suitable for lithium-based chemistries, these routes are applicable to cells having other types of chemistries.

A battery control unit 22 embedded within the battery pack 16 is responsible for protecting the battery cells and monitoring any fault conditions which may develop. In an exemplary embodiment, the battery control unit 22 is implemented in software on a digital microcontroller. However, the battery control unit 22 may be embodied in hardware or software as a digital microcontroller, a microprocessor or an analog circuit, a digital signal processor or by one or more digital ICs such as application specific integrated circuits (ASICs), for example. In certain arrangements, the battery control unit 22 may be continually powered by the battery cells. Although such power consumption may be minimized, the battery cells may reach an over-discharged state over a prolonged period of time.

Discharge current from the battery cells and charge current to the battery cells can be clamped or discontinued through the use of a switch 23. The switch 23 may be placed in series with the battery cells. In the exemplary embodiment, the switch is arranged on the low voltage side of the battery cells but may be disposed in other locations. The switch 23 can then be controlled by the battery control unit 22 to interrupt current flow to/from the battery cells. In an exemplary embodiment, the switch 23 is a transistor (e.g., a MOSFET). Other types of switches are also contemplated by this disclosure.

A current sensor 24 is configured to sense the current being supplied by the battery and provide a signal indicative of the sensed current to the battery control unit 22. In an exemplary embodiment, the current sensor 24 may be implemented using a current shunt disposed in series with the battery cells 20. The current shunt is preferably positioned on the low voltage side of the battery cells. In an alternative embodiment, the switch 23 is used as the current sensor (see FIG. 3). In other words, the battery control unit 22 monitors the current being drawn across the switch 23. In the case of the transistor, the current is measured using the resistance $R_{on}$ as a current shunt that converts the current into a voltage that can be read by the battery control unit. Other types of current sensors (e.g., a Hall effect current sensor) are also within the scope of this disclosure.

A voltage monitoring circuit 25 may be configured to sense individual cell voltage and sense total pack voltage of the cells 20. The voltage monitoring circuit provides a signal representing the individual cell or stack voltage to the battery control unit 22. Alternatively, the battery control unit 22 may direct the voltage monitoring circuit to periodically measure the cell voltage across each cell of the pack and the total pack voltage in a sequential manner. An average cell voltage may be determined by dividing the measured total pack voltage by the number of cells in the pack. The battery control unit 22 may in turn interface with a cell balancing module to control the balancing of cell voltages during the charging process. An exemplary voltage monitoring arrangement is further described in U.S. Patent Application Publication No. 2006/0071643 which is hereby incorporated by reference.

A temperature sensor 26 may be configured to measure the temperature of the battery cells. The temperature sensor in turn communicates the measure temperature to the battery control unit 22. The temperature sensor may be implemented with negative temperature coefficient (NTC) thermistor, a positive temperature coefficient (PTC) thermistor, temperature sensing integrated circuits, or thermocouples.

In an exemplary embodiment, the battery pack includes a sleep mode. The battery control unit 22 may initiate a sleep mode after a predefined period of time (e.g., 45 days) in which the pack has been inactive (i.e., pack is not being charged or discharged). Upon entering a sleep mode, the battery control unit 22 opens switch 23 so that no voltage is present at the terminals of the battery pack. The battery control unit 22 may also take other steps to reduce power consumption of the cells. For example, any microcontrollers residing in the battery pack may be placed in a low power consumption mode. In this way, the battery pack may reduce or avoid discharging of cells during periods of inactivity, including prior to being purchased by consumers. It is envisioned that the battery pack may initiate a sleep mode based on other battery conditions, such as pack temperature, individual cell or pack voltages, etc.

The battery pack may be awoken and returned to an operational state in a various ways. For instance, when the battery pack is inserted into a battery charger, the charger may send a signal to awaken the pack from a sleep mode. In another instance, when the battery pack is coupled to a tool, the tool may send a signal to awaken the pack. In yet another instance, the battery control unit 22 may initiate a timer upon entering a sleep mode. The length of the timer defines the sleep period. In an exemplary embodiment, the timer may be implemented in software although other types of timers are contemplated, such as analog timer circuits. Other techniques for awakening the pack are also contemplated by this disclosure. When the pack is awoken, the battery control unit 22 will close switch 23 and take other steps to return the pack to an operational state.

For charging purposes, the battery pack 16 may be selectively coupled to a battery pack charger 18. The battery pack charger 18 is generally comprised of a power supply circuit 30 and a charger control module 32. The battery pack charger may include a terminal voltage detection circuit 33 and a watchdog circuit 34. It is envisioned that other sensing and/or protections circuits may also be incorporated in the battery charger. This exemplary configuration is merely provided as a context for describing the various protection methods and circuits disclosed herein.

The charger control module 32 is responsible for charging the battery cells and monitoring any fault conditions which may develop. In an exemplary embodiment, the charger control module 32 is implemented in software on a digital microcontroller. However, the charger control module 32 may be embodied in hardware or software as a digital microcontroller, a microprocessor or an analog circuit, a digital signal processor or by one or more digital ICs such as application specific integrated circuits (ASICs), for example.

The voltage detection circuit 33 is interposed between the charging terminal 19-1 of the battery charger 18 and the charger control module 32. The voltage detection circuit 33 measures the voltage at the charging terminal. Although other implementations are contemplated, the voltage detection circuit 33 may be implemented as a conventional voltage attenuation circuit as is readily known in the art and need not be described further.

Charger control module 32 and battery control unit 22 may exchange data through a non-charging (data) terminal 19-2. This data terminal provides a serial data link between the two control units. Diagnostic measures made in the battery pack 16 may be passed by the battery control unit 22 to the charger control module 32. Conversely, control parameters may be passed from the charger control module 32 to the battery control unit. Exchanged data may include but is not limited to an identifier for the charger and/or battery pack, individual or total stack voltage as determined by the pack, temperature conditions in the pack, etc. Other types of communications are also contemplated by this disclosure.

In an exemplary embodiment, the battery charger determines presence of a battery pack by detecting a voltage across its terminals. The battery charger continually monitors the voltage across its terminal using the voltage detection circuit 33. When the voltage exceeds some predefined threshold, a pack is presumed to be coupled to the battery charger; whereas, when the voltage is at or near a zero value, no pack is presumed to be coupled to the charger. Other techniques for detecting the presence of a pack in the battery charger are also contemplated by this disclosure.

Whenever the charger detects the presence of a battery pack, it may make a determination as to whether to initiate a charge cycle. In an exemplary embodiment, an indicator of the charging cycle is maintained by the battery charger. For instance, when a battery pack is removed from the charger, the charger control module 32 may pull the non-charging terminal 19-2 to high. When a battery pack is subsequently placed in the charger, the charger control module 32 will initiate a charge cycle if the non-charging terminal 19-2 is high. The charger control module 32 cooperatively operates with the power supply circuit 30 to deliver a charging signal to the battery pack. The charging algorithm may vary for different types of cell chemistries as is known in the art.

When charging is complete, the charge control module 32 pulls the non-charging terminal 19-2 to low, thereby indicating that charging is complete and the pack is ready for discharge. The non-charging terminal 19-2 remains low until the pack is removed from the charger. Once the pack is removed from the charger, the non-charging terminal 19-2 is pulled high. In this way, the non-charging terminal 19-2 may be used to provide an indication of the charging cycle. However, it is contemplated that other types of indicators (e.g., software-implemented flag) may be maintained by the battery charger. Moreover, it is contemplated that such indicator may be maintained within the battery pack and communicated from the pack to the charger when operably coupled thereto.

Figure 3:
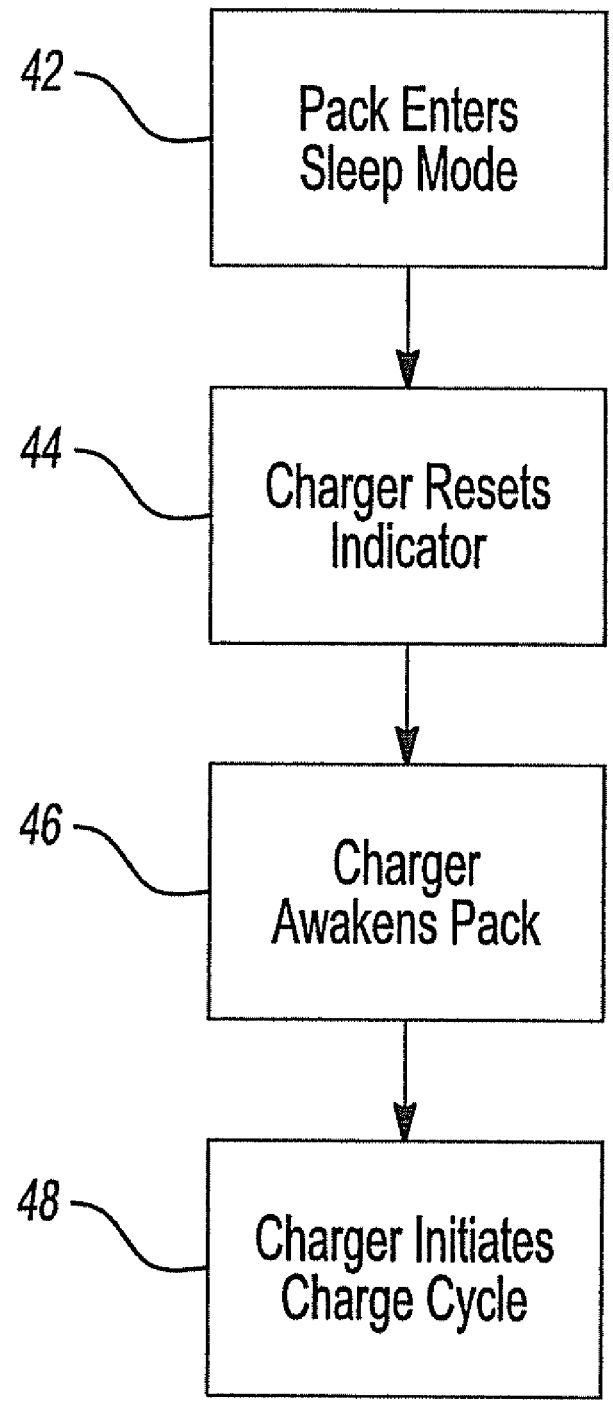
FIG. 3 is a flowchart illustrating an exemplary method for initiating a charge cycle for a battery pack left in a battery charger.

Depending on frequency of use, a battery pack may discharge over time. However, when a battery pack is left operably coupled to the battery charger, the charger may re-initiate the charge cycle as shown in FIG. 3, thereby re-charging the battery pack. In the exemplary embodiment, the battery pack will enter a sleep mode at 42 a predefined period of time after being left in the charger. As described above, the battery pack ceases outputting a voltage to its terminals when in a sleep mode. Since the battery charger no longer detects a terminal voltage, the charger assumes the battery pack has been removed and thus resets the non-charging terminal pin to high at 44.

To re-initiate the charge cycle, the battery charger attempts to send a ready-to-charge signal at 46 over the serial data link to awaken the battery pack. In response to the signal, the battery control unit 22 will close switch 23 and take other steps to return the pack to an operational state. In one exemplary embodiment, the battery charger attempts to awaken the battery pack by immediately sending the signal. In another embodiment, the battery charger may delay sending the signal until the expiration of an internal timer. In either case, the battery pack entering a sleep mode triggers the charger to re-initiate a charge cycle.

When the battery pack is awoken from its sleep mode, a voltage reappears at the terminals of the pack. In the event that the battery pack is coupled to the battery charger, the charger detects the presence of this voltage across its terminals in the manner described above. Since the non-charging terminal pin is set to high, the charger will re-initiate the charge cycle at 48. In this way, the charge cycle is periodically re-initiated to maintain a charged pack. In this unique approach, the battery pack implements a sleep function that cooperatively operates with the charger to re-initiate a charge cycle when the pack is left in the charger.

It may also be desirable to have the charger reinitiate the charge sequence without input from the battery. This re-initiation could be based on time, temperature and/or other factors. To have the charger re-initiate charge, the charger would simply reset the non-charging terminal to high at 44 regardless of pack terminal voltage. This would thus awaken the pack and restart the charge cycle as previously disclosed.

Other techniques for re-initiating the charge cycle when the pack is left in the charger are also contemplated by this disclosure.

The above description is merely exemplary in nature and is not intended to limit the present disclosure, application, or uses.

What is claimed is:

1. A charging system for a battery pack, comprising
a battery pack having one or more battery cells and a battery control unit therein, the battery control unit operable to place the battery pack in a sleep mode after a predefined period of inactivity; and
a battery charger adapted to receive the battery pack and operable to deliver a charging signal to the battery pack in response to the battery pack entering a sleep mode.

2. The charging system of claim 1 wherein the battery pack having two charging terminals such that the battery control unit removes a voltage present at the charging terminal when the battery pack enters a sleep mode.

3. The charging system of claim 1 wherein the battery pack having a switch in series with the battery cells such that the battery control unit opens the switch upon entering a sleep mode.

4. The charging system of claim 1 wherein the battery charger having a charge control unit which maintains an indicator for when to charge the battery pack, wherein the charge control unit sets the indicator to charge the battery pack when the battery pack enters a sleep mode.

5. The charging system of claim 4 wherein the battery charger sends a signal to awaken the battery pack when the battery pack enters a sleep mode.

6. The charging system of claim 5 wherein the battery charger delays sending the signal to awaken the battery pack until expiration of a timer maintained in the battery charger.

7. The charging system of claim 5 wherein the battery pack having a switch in series with the battery cells such that the battery control unit opens the switch upon entering a sleep mode and closes the switch when awoken from a sleep mode.

8. The charging system of claim 5 wherein the charge control unit is operable to deliver a charging signal to the battery pack when the indicator is set to charge the battery pack and the charge control unit detects the battery pack operably coupled to the battery charger.

* * * * *